United States Patent [19]

Inoue et al.

[11] Patent Number: 4,801,622

[45] Date of Patent: Jan. 31, 1989

[54] CURABLE AND FOAMABLE ORGANOPOLYSILOXANE COMPOSITION

[75] Inventors: Yoshio Inoue; Atsushi Yaginuma, both of Gunma, Japan

[73] Assignee: Shin-Etsu Chemical Co., Ltd., Tokyo, Japan

[21] Appl. No.: 150,165

[22] Filed: Jan. 29, 1988

[30] Foreign Application Priority Data

Feb. 3, 1987 [JP] Japan .................................. 62-22794

[51] Int. Cl.$^4$ ................................................ C08J 9/00
[52] U.S. Cl. ...................................... 521/134; 521/154; 525/478; 525/479; 528/15; 528/31; 528/32
[58] Field of Search ............................. 528/15, 31, 32; 525/478, 479; 521/154, 134

[56] References Cited

U.S. PATENT DOCUMENTS 3,923,705 12/1975 Smith ..................................... 521/154
4,590,222 5/1986 Bauman ................................ 521/154
4,593,049 6/1986 Bauman ................................ 521/154
4,695,597 9/1987 Seino ..................................... 521/154

Primary Examiner—Morton Foelak
Attorney, Agent, or Firm—Millen & White

[57] ABSTRACT

The curable and foamable organopolysiloxane composition comprises three different organopolysiloxanes, of which (A) the first is an α,ω-divinyl dimethyl polysiloxane, (B) the second is an organopolysiloxane having, in a molecule, at least three silicon-bonded hydroxy groups and (C) the third is an organohydrogenpolysiloxane having, in a molecule, at least two silicon-bonded hydrogen atoms, along with a platinum catalyst. The platinum-catalyzed curing and foaming reactions proceed in two ways of, one, the hydrosilation between the vinyl groups in (A) and the silicon-bonded hydrogen atoms in (C) and, the other, by the dehydrogenation between the silanol groups in (B) and the silicon-bonded hydrogen atoms in (C). The composition gives a cured and foamed silicone rubber body having excellent mechanical properties with a good cell structure by standing at room temperature or by heating up to 70° C.

9 Claims, No Drawings

CURABLE AND FOAMABLE ORGANOPOLYSILOXANE COMPOSITION

BACKGROUND OF THE INVENTION

The present invention relates to a curable and foamable organopolysiloxane composition or, more particularly, to an organopolysiloxane composition curable and simultaneously foamable into a cellular foamed silicone rubber having uniform distribution of the foam cells and high mechanical strengths and particularly useful as a material for sealing and filling in the building construction works. The invention also relates to a cured and foamed silicone rubber body obtained from the organopolysiloxane composition.

Known silicone rubber compositions in the prior art include those capable of foaming with simultaneous curing at room temperature or at a relatively low temperature above room temperature. Of the various types of foamable silicone rubber compositions, for example, Japanese patent publication Nos. 33-9297 and 44-8755 disclose a foamable composition in which foaming of the composition takes place with hydrogen gas as the foaming gas produced by the dehydrogenation reaction between an organopolysiloxane having hydrogen atoms directly bonded to the silicon atoms, referred to as the silicon-bonded hydrogen atoms hereinbelow, and an organosilane compound having a hydroxy group bonded directly to the silicon atom or a so-called organosilanol compound in the presence of a dehydrogenation catalyst such as quaternary ammonium salts, heavy metal carboxylates, alkali metal alkoxides and the like. Similar foamable compositions by use of a platinum catalyst are disclosed in Japanese patent publication Nos. 45-12675 and 52-42826 and Japanese patent Kokai No. 56-23462.

These foamable silicone rubber compositions in the prior art are practically not quite satisfactory as a material for sealing and filling in building construction works because of the relatively low mechanical strengths of the cured and foamed silicone rubber product obtained from the composition as well as poor uniformity in the distribution of the foam cells therein.

SUMMARY OF THE INVENTION

An object of the present invention accordingly is to provide an organopolysiloxane composition capable of being cured with simultaneous foaming to give a foamed silicon rubber body having high mechanical strengths and uniformity in the cell distribution.

Thus, the curable organopolysiloxane composition of the invention comprises, in admixture:

(A) 100 parts by weight of a first organopolysiloxane which is an $\alpha,\omega$-divinyl diorganopolysiloxane represented by the general formula $$ViR_2Si-O-(-SiR_2-O-)_n-SiR_2Vi, \tag{I}$$

in which Vi is a vinyl group, R is a monovalent hydrocarbon group free from aliphatic unsaturation and n is a positive integer in the range from 50 to 2000, and having a viscosity in the range from 20 to 10,000,000 centipoise at 25° C.;

(B) from 1 to 200 parts by weight of a second organopolysiloxane having, in a molecule, at least three siloxane units represented by the unit formula $$R_a(OH)_bSiO_{(4-a-b)/2}, \tag{II}$$

in which R has the same meaning as defined above, a is zero, 1 or 2 and b is 1, 2 or 3 with the proviso that a+b is 1, 2 or 3, and having a viscosity in the range from 10 to 10,000 centipoise at 25° C.;

(C) from 0.1 to 100 parts by weight of an organohydrogenpolysiloxane having, in a molecule, at least two siloxane units represented by the unit formula $$R_cH_dSiO_{(4-c-d)/2}, \tag{III}$$

in which R has the same meaning as defined above, c is zero, 1 or 2 and d is 1 or 2 with the proviso that c+d is 1, 2 or 3, and having a viscosity in the range from 1 to 100,000 centipoise at 25° C.; and (D) a platinum compound in an amount effective to catalytically promote the curing reaction of the composition.

DETAILED DESCRIPTION OF THE PREFERRED EMBODIMENTS

As is described above, the essential ingredients in the inventive composition are the three types of polysiloxane compounds as the components (A), (B) and (C) with admixture of a platinum catalyst as the component (D). When the composition is kept at room temperature or at a somewhat increased temperature, curing reaction of the composition proceeds simultaneously with the dehydrogenation reaction to produce hydrogen gas so that a cured and foamed silicone rubber body having excellent mechanical properties can readily be obtained.

The first organopolysiloxane as the component (A) is an $\alpha,\omega$-divinyl diorganopolysiloxane represented by the general formula $$ViR_2Si-O-(-SiR_2-O-)_n-SiR_2Vi, \tag{I}$$

in which Vi is a vinyl group and R is a monovalent hydrocarbon group free from aliphatic unsaturation exemplified by alkyl groups, e.g., methyl, ethyl, propyl and butyl groups, cycloalkyl groups, e.g., cyclohexyl group, and aryl groups, e.g., phenyl and tolyl groups, as well as those substituted groups obtained by replacing a part or all of the hydrogen atoms in the above named hydrocarbon groups with substituents such as halogen atoms, cyano groups and the like exemplified by chloromethyl, 3,3,3-trifluoropropyl and 2-cyanoethyl groups. Although it is optional that the molecules of the vinyl-terminated diorganopolysiloxane of the general formula (I) contain two kinds or more of different monovalent hydrocarbon groups as R, it is preferable that most or all of the groups denoted by R are methyl groups. The subscript n in the general formula (I) is a positive integer in the range from 50 to 2000 so that the organopolysiloxane as the component (A) may have a viscosity in the range from 20 to 10,000,000 centipoise or, preferably, from 700 to 50,000 centipoise at 25° C.

The second organopolysiloxane as the component (B) is a silanolic hydroxy-containing organopolysiloxane having, in a molecule, at least three siloxane units represented by the unit formula $$R_a(OH)_bSiO_{(4-a-b)/2}, \tag{II}$$

in which R has the same meaning as defined above, a is zero, 1 or 2 and b is 1, 2 or 3 with the proviso that a+b is 1, 2 or 3, and having a viscosity in the range from 10 to 10,000 centipoise at 25° C. It is preferable that most or all of the groups denoted by R are methyl groups. The molecular structure of the organopolysiloxane is not particularly limitative including straightly linear, branched chain-like and cyclic ones provided that the viscosity thereof is in the range from 10 to 10,000 centipoise at 25° C. It is preferable, however, that the organopolysiloxane has a straightly linear molecular structure represented by the general formula

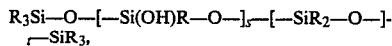

in which R has the same meaning as defined above or, preferably, is a methyl group, s is a positive integer of 3 or larger and t is zero or a positive integer with the proviso that s't is in the range from 3 to 100.

The amount of the component (B) in the inventive organopolysiloxane composition is preferably in the raqnge from 1 to 200 parts by weight or, more preferably, from 5 to 40 parts by weight per 100 parts by weight of the component (A). Alternatively, suitable amounts of the component (B) can de defined in terms of the molar ratio of the silanolic hydroxy groups in the component (B) to the vinyl groups in the component (A). Namely, the component (B) is formulated preferably in an amount to provide the silicon-bonded hydroxy groups in a molar amount of from 3 to 30 times of the vinyl groups in the component (A). When the amount of the component (B) is too small, deficiency is caused in the volume of the hydrogen gas produced by the dehydrogenation reaction between the component (B) and the component (C) described below resulting in poor foamability of the composition. When the amount thereof is too large, on the other hand, certain adverse influences are caused on the mechanical properties of the cured and foamed silicone rubber obtained from the composition including an unduly decreased hardness.

The silanol-containing organopolysiloxane as the component (B) can be synthesized by the dehydrogenation reaction of an organohydrogenpolysiloxane having, in a molecule, at least three siloxane units represented by the unit formula

in which R, a and b each have the same meaning as defined above, with water in a suitable organic solvent such as tetrahydrofuran, 1,4-dioxane and the like in the presence of a catalytic amount of a platinum compound.

Several examples of the silanol-containing organopolysiloxane suitable as the component (B) are those expressed by the following structural formulas, in which Me and Pr are methyl and propyl groups, respectively, though not particularly limitative thereto:

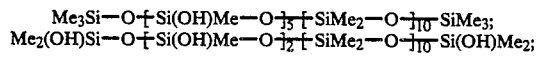

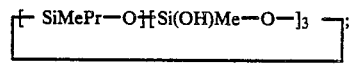

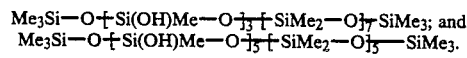

The component (C) in the inventive organopolysiloxane composition is an organohydrogenpolysiloxane having, in a molecule, at least two siloxane units represented by the unit formula

in which R has the same meaning as defined above, c is zero, 1 or 2 and d is 1 or 2 with the proviso that c+d is 1, 2 or 3. It is preferable that most or all of the groups denoted by R are methyl groups. The molecular structure of the organohydrogenpolysiloxane is not particularly limitative including straightly linear, branched chainlike and cyclic ones provided that the viscosity thereof is in the range from 1 to 100,000 centipoise at 25° C . It is preferable, however, that the organohydrogenpolysiloxane has a straightly linear molecular structure represented by the general formula

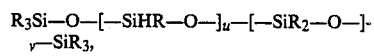

in which R has the same meaning as defined above or, preferably, is a methyl group, u is a positive integer of 2 or larger and v is zero or a positive integer with the proviso that u+v is in the range from 2 to 100.

The amount of the component (C) in the inventive organopolysiloxane composition is preferably in the range from 0.1 to 100 parts by weight or, more preferably, from 5 to 40 parts by weight per 100 parts by weight of the component (A). Alternatively, a suitable amount of the component (C) is defined in terms of the molar amount of the silicon-bonded hydrogen atoms in the component (C) relative to the total molar amount of the vinyl groups in the component (A) and the silanolic hydroxy groups in the component (B). For example, the component (C) preferably provides from 0.6 to 40 moles of the silicon-bonded hydrogen atoms per mole of the vinyl groups in the component (A) and silanolic hydroxy groups in the component (B) as a total.

The component (D) is a platinum compound which acts as a catalyst for the two different reactions of, one, the addition reaction or so-called hydrosilation between the vinyl-containing organopolysiloxane as the component (A) and the organopolysiloxane having silicon-bonded hydrogen atoms as the component (C) and, the other, the dehydrogenation reaction between the silanol-containing organopolysiloxane as the component (B) and the organohydrogenpolysiloxane having silicon-bonded hydrogen atoms as the component (C). Examples of the platinum compound suitable as the catalyst in this regard include chloroplatinic acid, platinum-olefin complexes, complexes of platinum with a vinyl-containing organosilane or organopolysiloxane compound, platinum-phosphite complexes, platinum-phosphine complexes and the like. The amount of the catalytic platinum compound as the component (D) in the inventive organopolysiloxane composition is not particularly limitative depending on the desired velocities of the curing and foaming reactions. It is usual, however, that satisfactory results can be obtained by admixing the composition with the platinum compound in an amount in the range from 1 to 200 ppm by weight or, in most cases, from 5 to 50 ppm by weight calculated as platinum based on the total amount of the components (A), (B) and (C).

The organopolysiloxane composition of the present invention can be obtained by uniformly blending the above described components (A) to (D) each in a calculated and weighed amount. It is optional that the composition is further compounded with an inorganic filler in an amount of, for example, from 1 to 100 parts by weight per 100 parts by weight of the total amount of the components (A) to (C) with an object to improve the mechanical properties of the cured silicone rubber obtained from the composition. Suitable inorganic fillers include finely divided silica powders, calcium carbonate, clacium silicate, titanium dioxide, iron (III) oxide, zinc oxide, carbon black and the like. It is further optional that the composition is admixed with various kinds of known additives including foaming accelerators such as organic blowing agents, e.g., azobisisobutyronitrile, N,N'-dimethyl-N,N'-dinitroso terephthalamide and the like, low-boiling point organic compoounds as a blowing agent, e.g., methyl alcohol, cyclohexane, Freons and the like, and surface active agents to decrease the surface tension of the composition, coloring agents, e.g., pigments and dyes, heat-resistance improvers, flame retardants, silane coupling agents as an adhesion improver and so on.

The inventive organopolysiloxane composition prepared by blending the components (A) to (D) together with other optional additives can be cured with simultaneous foaming into a foamed silicone rubber body when the composition is kept at room temperature. When acceleration of the curing and foaming process is desired, the composition is heated at a temperature in the range from 30° to 70° C.

In the following, the organopolysiloxane composition of the invention is described in more detail by way of examples as preceded by the description of the synthetic procedure for the preparation of the silanol-containing organopolysiloxane as the component (B). In the following examples, the term of "parts" always refers to "parts by weight" and the values of viscosity are all those obtained by the measurement at 25° C.

Preparation 1.

A reaction mixture was prepared by dissolving 598 g of a methyl hydrogen polysiloxane expressed by the formula Me$_3$Si—O—[—SiHMe—O—]$_5$—[—SiMe$_2$—O—]$_{10}$—SiMe$_3$ in 2674 g of tetrahydrofuran together with 9.7 g of a solution of chloroplatinic acid in isopropyl alcohol in a concentration of 2% by weight as platinum. Into the mixture heated and kept at 50° to 60° C. were added dropwise 49.7 g of water and the mixture was kept at the same temperature for 3 hours after completion of the dropwise addition of water. Thereafter, the mixture was admixed with 30 g of active carbon and 250 g of anhydrous sodium sulfate and agitated for 2 hours followed by filtration. The filtrate was subjected to distillation at 40° C. under a pressure of 30 mmHg to remove the tetrahydrofuran so that 507 g of a polyhydroxy methyl polysiloxane, referred to as the OH-siloxane I hereinbelow, were obtained which could be expressed by the formula Me$_3$Si—O—[—Si(OH)Me—O—]$_5$—[—SiMe$_2$—O—]$_{10}$—SiMe$_3$.

This product had a viscosity of 63 centipoise, specific gravity of 1.018 and refractive index of 1.410 and contained 0.40 mole/100 g of the silanolic hydroxy groups.

Preparation 2.

A reaction mixture was prepared by dissolving 500 g of a methyl hydrogen polysiloxane expressed by the formula Me$_3$Si—O—[—SiHMe—O—]$_4$—[—SiMe$_2$—O—]$_{24}$—SiMe$_3$ in 3000 g of tetrahydrofuran together with 10.2 g of the same solution of chloroplatinic acid in isopropyl alcohol as used in Preparation 1. The subsequent procedure was substantially the same as in Preparation 1 to give 437 g of a polyhydroxy methyl polysiloxane, referred to as the OH-siloxane II hereinbelow, which could be expressed by the formula Me$_3$Si—O—[—Si(OH)Me—O—]$_4$—[—SiMe$_2$—O—]$_{24}$—SiMe$_3$.

This product had a viscosity of 125 centipoise, specific gravity of 1.000 and refractive index of 1.407 and contained 0.18 mole/100 g of the silanolic hydroxy groups.

Examples 1 to 6.

Six organopolysiloxane compositions, referred to as the compositions I to VI hereinbelow, were prepared each by uniformly blending 100 parts of an α,ω-divinyl dimethyl polysiloxane having a viscosity of 5000 centipoise and expressed by the formula Vi—[—SiMe$_2$—O—]$_{413}$—SiMe$_2$Vi, a varied amount of the OH-siloxane I obtained in Preparation 1 described above, a varied amount of a methyl hydrogen polysiloxane expressed by the formula Me$_3$Si—O—[—SiHMe—O—]$_{38}$—SiMe$_3$, referred to as the H-siloxane hereinbelow, 0.2 part of the same solution of chloroplatinic acid in isopropyl alcohol as used in Preparation 1 and 20 parts of a finely divided silica filler.

Each of the compositions I to VI was kept at 20° C. in an atmosphere of 55% relative humidity for 1 hour so that the composition was expanded by foaming and cured into a foamed silicone rubber body, of which measurements were made of the ratio of expansion, surface tackiness and uniformity of cell size distribution as well as mechanical properties in the form of a sheet to give the results shown in Table 1

TABLE 1

| Composition No. | I | II | III | IV | V | VI |
| --- | --- | --- | --- | --- | --- | --- |
| OH—siloxane I taken, parts | 12.3 | 12.3 | 12.3 | 16.4 | 8.2 | 8.2 |
| H—siloxane taken, parts | 10.0 | 13.3 | 16.6 | 12.8 | 9.5 | 11.9 |
| Ratio of expansion, % | 290 | 330 | 370 | 350 | 280 | 290 |
| Surface tackiness | No | No | Yes | No | Yes | No |
| Uniformity of cells | Good | Good | Poor | Good | Good | Good |
| Hardness, Ascar C | 23 | 20 | 18 | 19 | 25 | 23 |
| Ultimate elongation, % | 100 | 110 | 130 | 110 | 100 | 100 |
| Tensile strength, kg/cm$^2$ | 2.0 | 1.7 | 1.6 | 1.8 | 2.0 | 2.0 |

Examples 7 and 8.

Two organopolysiloxane compositions, referred to as the compositions VII and VIII hereinbelow, were prepared each by uniformly blending 100 parts of the same $\alpha,\omega$-divinyl dimethyl polysiloxane as used in Examples 1 to 6, 12.3 parts or 25.0 parts of the OH-siloxanes I or II prepared in Preparations 1 or 2, respectively, 13.3 parts of the same methyl hydrogen polysiloxane as used in Examples 1 to 6, 0.2 part of the same solution of chloroplatinic acid in isopropyl alcohol as used in Preparation 1 and 20 parts of a finely divided silica filler.

Each of the compositions VII and VIII was subjected to the same curing and foaming test as in Examples 1 to 6 to give the following results, respectively: ratio of expansion 330% and 270%; good uniformity of cell size distribution in each; hardness, Asker C, 20 and 15; ultimate elongation 110% and 100%; and tensile strength 1.7 kg/cm² in each.

Comparative Example 1.

The experimental procedure was substantially the same as in Example 7 except that the $\alpha,\omega$-divinyl dimethyl polysiloxane was omitted in the formulation of the organopolysiloxane composition. The results of testing of the composition were: ratio of expansion of 110%; tensile strength of 1.2 kg/cm²; ultimate elongation of 20%; and poor uniformity of cell size distribution.

Comparative Example 2.

An organopolysiloxane composition was prepared by uniformly blending 100 parts of the same $\alpha,\omega$-divinyl dimethyl polysiloxane as used in Examples 1 to 6, 35.8 parts of a silanolic hydroxy-containing polysiloxane expressed by the average formula $$Me_3Si-O-[-Si(OH)Me-O-]_{2.5}-[-SiMe_2-O-]_{13.5}-SiMe_3,$$

13.3 parts of the same methyl hydrogen polysiloxane as used in Examples 1 to 6, 0.2 part of the same solution of chloroplatinic acid in isopropyl alcohol as used in Preparation 1 and 20 parts of a finely divided silica filler.

Curing and foaming test of the thus prepared composition was performed in the same manner as in the preceding examples to give the following results: ratio of expansion 130%; poor uniformity of cell size distribution; hardness, Asker C, 10; ultimate elongation 40%; and tensile strength 0.8 kg/cm².

What is claimed is:

1. A curable and foamable organopolysiloxane composition which comprises, in admixture:

(A) 100 parts by weight of a first organopolysiloxane which is an $\alpha,\omega$-divinyl diorganopolysiloxane represented by the general formula $$ViR_2Si-O-(-SiR_2-O-)_n-SiR_2Vi,$$

in which Vi is a vinyl group, R is a monovalent hydrocarbon group free from aliphatic unsaturation and n is a positive integer in the range from 50 to 2000, and having a viscosity in the range from 20 to 10,000,000 centipoise at 25° C.;

(B) from 1 to 200 parts by weight of a second organopolysiloxane having, in a molecule, at least three siloxane units represented by the unit formula $$R_a(OH)_bSiO_{(4-a-b)/2},$$

in which R has the same meaning as defined above, a is zero, 1 or 2 and b is 1 or 2 with the proviso that a+b is 1, 2 or 3, and having a viscosity in the range from 10 to 10,000 centipoise at 25° C.;

(C) from 0.1 to 100 parts by weight of an organohydrogenpolysiloxane having, in a molecule, at least two siloxane units represented by the unit formula $$R_cH_dSiO_{(4-c-d)/2},$$

in which R has the same meaning as defined above, c is zero, 1 or 2 and d is 1 or 2 with the proviso that c+d is 1, 2 or 3, and having a viscosity in the range from 1 to 100,000 centipoise at 25° C.; and (D) a platinum compound in an amount effective to catalytically promote the curing reaction of the composition.

2. The curable and foamable organopolysiloxane composition as claimed in claim 1 wherein the group denoted by R is selected from alkyl groups, aryl groups and cycloalkyl groups.

3. The curable and foamable organopolysiloxane composition as claimed in claim 1 wherein the amount of the component (B) is sufficient to provide from 3 to 30 moles of the hydroxy groups bonded to the silicon atoms per mole of the vinyl groups in the component (A).

4. The curable and foamable organopolysiloxane composition as claimed in claim 1 wherein the amount of the component (C) is sufficient to provide from 0.6 to 40 moles of the hydrogen atoms directly bonded to the silicon atoms per mole of the total amount of the vinyl groups in the component (A) and the hydroxy groups bonded to the silicon atoms in the component (B).

5. The curable and foamable organopolysiloxane composition as claimed in claim 1 wherein the amount of the component (D) is in the range from 1 to 200 ppm by weight as platinum based on the total amount of the components (A), (B) and (C).

6. The curable and foamable organopolysiloxane composition as claimed in claim 1 wherein the component (A) is an $\alpha,\omega$-divinyl dimethyl polysiloxane having a viscosity in the range from 700 to 50,000 centipoise at 25° C.

7. The curable and foamable organopolysiloxane composition as claimed in claim 1 wherein the component (B) is a methyl hydroxy polysiloxane represented by the general formula $$Me_3Si-O-[-Si(OH)Me-O-]_s-[-SiMe_2-O-]_t-SiMe_3,$$

in which Me is a methyl group, s is a positive integer of 3 or larger and t is zero or a positive integer with the proviso that s+t does not exceed 100.

8. The curable and foamable organopolysiloxane composition as claimed in claim 1 wherein the component (C) is a methyl hydrogen polysiloxane represented by the general formula $$Me_3Si-O-[-SiHMe-O-]_u-[-SiMe_2-O-]_v-SiMe_3,$$

in which Me is a methyl group, u is a positive integer of 2 or larger and v is zero or a positive integer with the proviso that u+v does not exceed 100.

9. A cured and foamed silicone rubber body which is a product obtained by curing and foaming of the organopolysiloxane composition according to claim 1.

* * * * *